Figure 5:
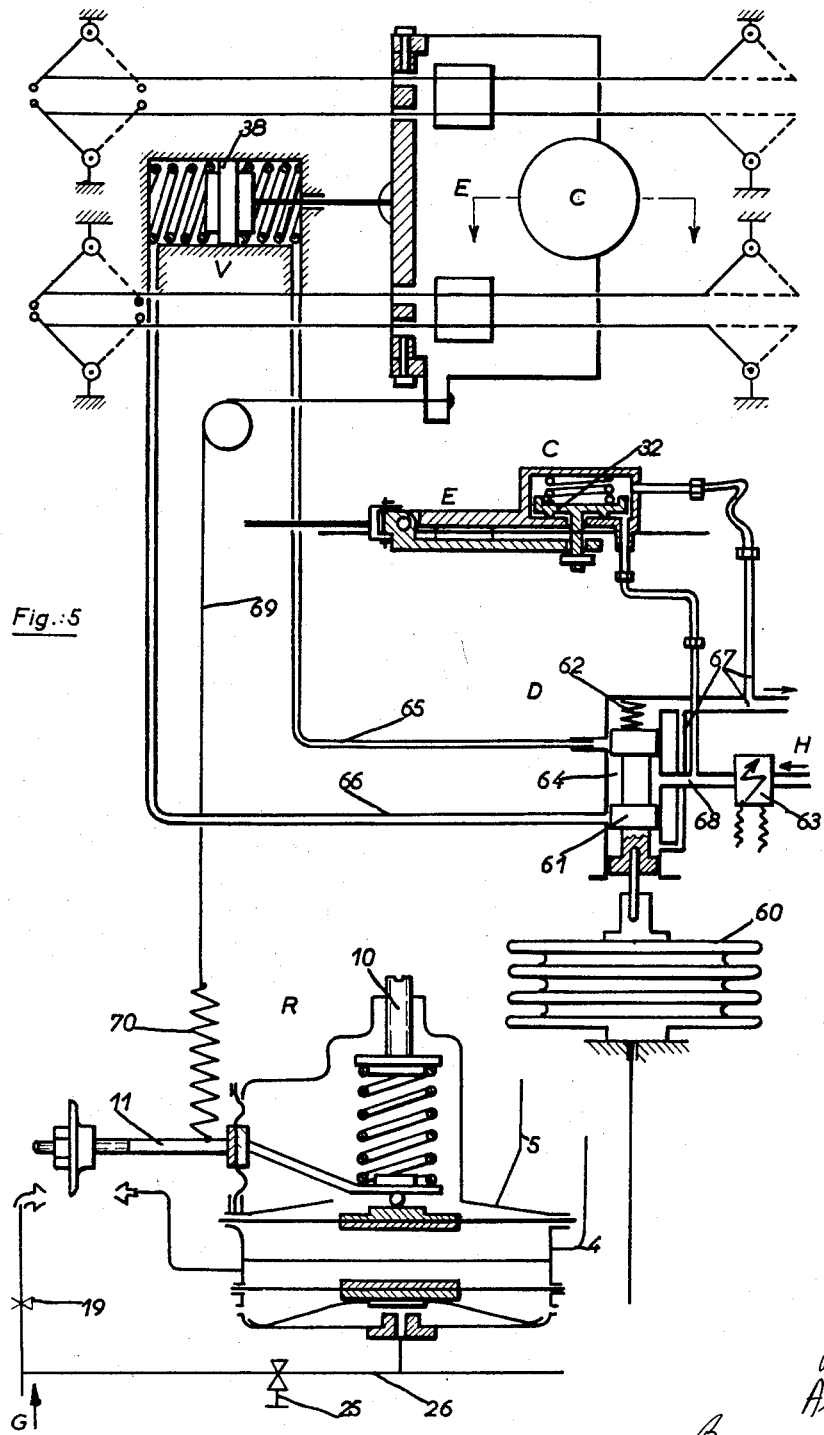

Jan. 19, 1965   R. PERRET ETAL   3,166,275
MONITORING DEVICE FOR PILOTED VEHICLES
Filed June 29, 1962   3 Sheets-Sheet 1
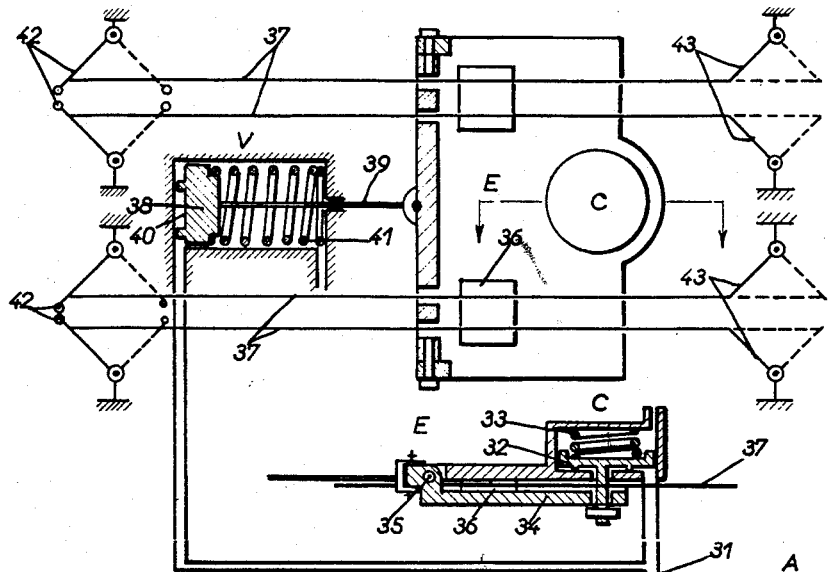
Fig.:1
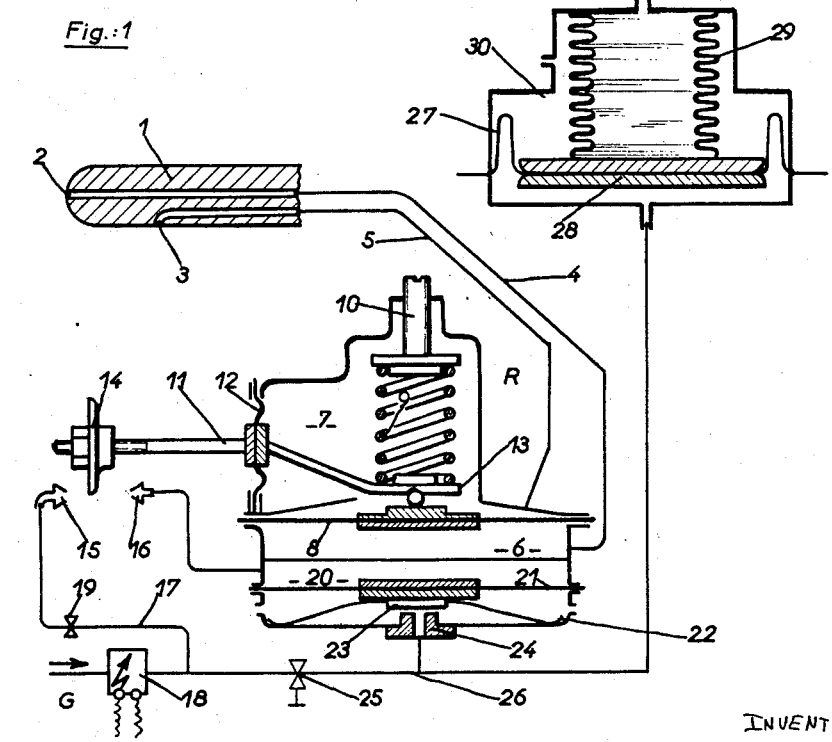
INVENTORS
Rene Perret
Alfred Trinkler
By Watson, Cole, Grindle & Watson
ATTORNEYS Jan. 19, 1965  R. PERRET ETAL  3,166,275
MONITORING DEVICE FOR PILOTED VEHICLES
Filed June 29, 1962  3 Sheets-Sheet 2
Fig.:2
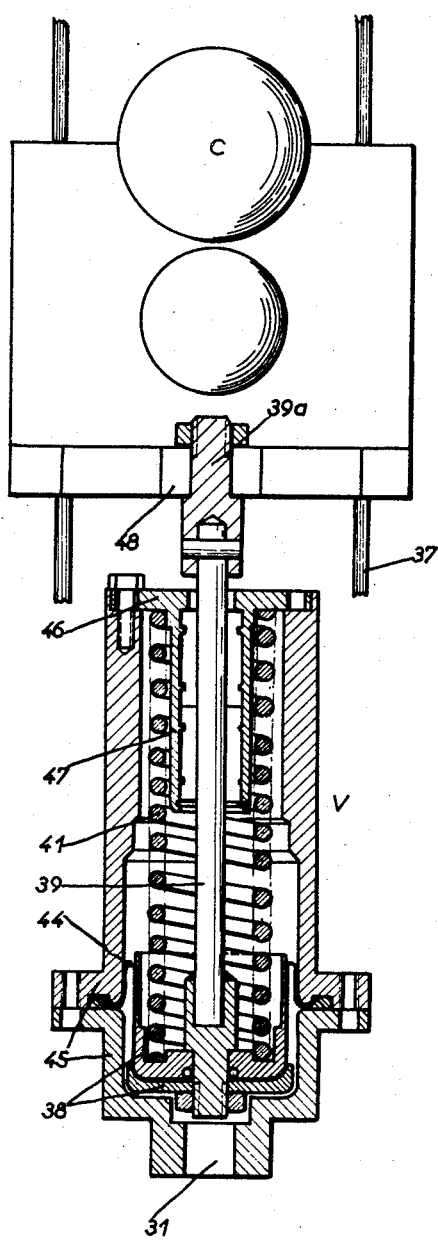
Fig.:3
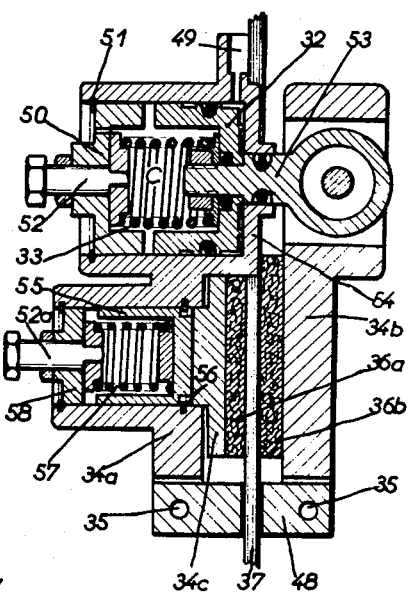
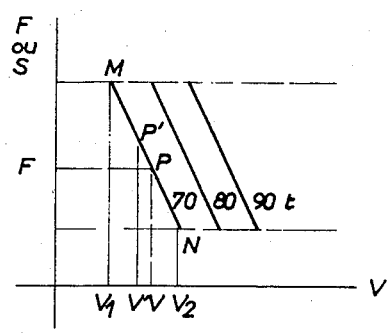
Fig.:4
INVENTORS
Rene Perret
Alfred Trinkler
By Watson, Cole, Grindle & Watson
ATTORNEYS United States Patent Office 3,166,275
Patented Jan. 19, 1965

3,166,275
MONITORING DEVICE FOR PILOTED VEHICLES
René Perret, Colombes, and Alfred Trinkler, Dammarie-les-Lys, France, assignors to Societe Nationale d'Etude et de Construction de Moteurs d'Aviation, Paris, France, a company of France
Filed June 29, 1962, Ser. No. 206,387
Claims priority, application France, July 4, 1961, 866,898
7 Claims. (Cl. 244—76)

This invention relates to monitoring devices for piloted vehicles.

In our earlier copending application Serial No. 166,141 filed January 15, 1962 and entitled "Monitoring of Aircraft During the Landing Approach Phase," there is described a method of controlling the speed of an aircraft in the approach phase by means of a differential pressure such as, for example, dynamic pressure, and various constructional forms of a suitable device for that purpose.

According to the simplest of these constructional forms, the difference in the total pressure and static pressure applied on both sides of a diaphragm acts on a lever connected to the latter and the movement of which in front of a nozzle alters the pressure in a pipe supplying the usual thrust regulator of a turbojet engine during the landing approach. This usual regulator which, for example, varies the section of the nozzle of the turbojet engine, is thus directly dependent on the speed on course during this stage of flight.

A second improved constructional form comprises a supplementary amplification stage in which the pressure downstream of the first nozzle acts on a diaphragm throttling more or less a second nozzle. It is this second nozzle which regulates the pressure in the pipe supplying the conventional thrust regulator of the turbojet engine.

The pilot of the machine is thus relieved of the supervision of the speed. However, it is highly desirable from the point of view of safety that the pilot, who is no longer compelled to carry out such supervision, should retain a constant indication of the operation of the regulator and preserve the possibility of intervening with manual control immediately, for example in the case of breakdown of the regulator or in order to re-open the throttle.

According to the present invention, a monitoring device (comprising, for example, a detector for the dynamic pressure which corresponds to the flying speed, an amplifier for said pressure and a jack) moves a friction coupling embracing with a calibrated force the linkage connecting the throttle levers to the engines of an aircraft in the usual manner.

The presence of such a coupling enables the pilot to intervene manually at any instant without even having to render the monitoring device inoperative, the sole condition being that the force corresponding to the grip of said coupling has a value lower than the muscular force which the pilot is himself able to transmit to said linkage.

The coupling described hereinafter is applied, by way of example of the application of the invention, to the throttle control of one engine at least with the aim of stabilising the speed of an aircraft on its course, but other methods of application which would be applied to piloting monitoring devices of a different nature mounted on any piloted vehicle whatsoever are also possible with the invention.

According to an advantageous form of embodiment, the coupling comprises two articulated jaws provided with friction linings which embrace the cables or linkages corresponding to the control regulation of which is to be ensured. The gripping of the jaws and their longitudinal movements carrying the linkage along are effected by hydraulic jacks. Finally, a device limiting the gripping force sets in action a spring having a flexibility sufficient for the force which it develops to vary but little on bringing together the jaws.

Certain accessory arrangements which are appropriate for the principle of the invention are also described in detail hereinafter.

The description which follows with reference to the accompanying drawings, which are given solely by way of non-limitative example, will make the various features of the invention and the method of carrying them into effect clearly understood, any arrangement appearing both from the text and from the figures of the drawings coming within the scope of the present invention. In the drawings:

FIGURE 1 shows in diagrammatic form a device for monitoring the speed of a four-engined aircraft in which a coupling E embracing the throttle control cables is actuated by a cylinder C and shifted by means of a single-acting jack V. The jack is itself actuated by the outlet pressure of an amplifier A to which an input signal is supplied by a regulator R having a diaphragm sensitive to dynamic pressure, FIGURES 2 and 3 are two sections, in plan view and elevation, respectively, of the coupling proper, FIGURE 4 is a diagram of the operating characteristics of the device, and FIGURE 5 shows, still in diagrammatic form, a modified arrangement of the coupling E. The latter is shifted by means of a double-acting jack V and is connected to the regulator R by a mechanical return connection. The amplifier A in FIGURE 1 is replaced by a hydraulic distributor D.

Referring to FIGURE 1, there will be seen the throttle controls of a four-engined aircraft which are constituted by pilot hand levers 42 connected by cables or rods 37 to levers 43 carried by the engines. The coupling E is represented by two diagrammatic sections which are respectively shown in plan view, in the upper portion of the drawing, and in elevation immediately below said plan view. It consists essentially of two jaws 34 articulated at 35 and embracing the cables 37 through the medium of linings 36. The gripping action of the coupling E is controlled by means of a pressure conduit 31 which supplies a liquid under pressure to a cylinder C in which there is disposed a piston 32 urged to the release position by a return spring 33. The conduit 31 also supplies a single-acting jack V, the body of which is fixed and houses a piston 38 returned by a spring 41 and connected to the coupling E by a rod 39.

The device for regulating the hydraulic pressure in the conduit 31 comprises, for example, the pressure amplifier A connected by a conduit 26' to the "regulator" R of the type described in the aforesaid patent application.

The amplifier A comprises a deformable diaphragm 27 fixed to a piston 28 to which there is attached a bellows 29. The lower face of the piston 28 closes a space or chamber connected to the conduit 26, while its upper face closes another annular space or chamber 30 open to the atmosphere and disposed around the bellows 29, which has a diameter smaller than that of the diaphragm 27. The hydraulic pressure in the conduit 31 therefore remains proportional to the air pressure in the duct 26, the amplification ratio being that of the surfaces of the diaphragm and the bellows.

It will be clear that it would be possible to replace the bellows 29, which constitutes the smaller of the two operative surfaces of the amplifier A, by a sliding piston of the same diameter provided, for example, with conventional sealing means of the piston-ring type, and also by a foldable diaphragm such as 27. Since the application of similar means can be extended to the larger operative surface, the number of variants of the constructional form of the amplifier A shown in FIGURE 1 which can be obtained by combinations of pistons, diaphragms and bellows is equal to nine.

The regulator R comprises two chambers 6 and 7 connected by conduits 4 and 5 to a probe 1 having a total pressure intake 2 and a static pressure intake 3. These chambers are separated by a deformable diaphragm 8 suitably calibrated by means of a spring 9 connected to a screw cap 10. A lever 11 pivoting on another deformable diaphragm 12 and the end 13 of which is displaceable with the diaphragm 8 carries at its opposite end an obturator 14 adjustable in position along the lever 11 and arranged between two nozzles 15 and 16.

The nozzle 15 is disposed downstream of a restrictor 19 in a compressed air conduit 17 supplied through the medium of an electro-valve 18. The nozzle 16 is connected to a chamber 20 closed by a deformable diaphragm 21 returned by a spring 22 and fixed to an obturator 23 disposed in front of a nozzle 24. The latter is arranged so that it is branched off from the conduit 26, which is itself connected to the conduit 17 through an adjustable restrictor 25.

FIGURES 2 and 3 show in a more detailed manner an advantageous constructional form of the coupling proper. FIGURE 2 shows in plan view the coupling and the jack V, the latter being shown in section along a diametral plane. FIGURE 3 shows in sectional elevation the clamping or gripping cylinder C and the force-limiting device.

The coupling is constituted by two jaws 34a and 34b (FIGURE 3) pivoting at 35 on a part 48 which is substantially at right angles to the jaws. The body of the jack C is integral with the jaw 34a and is supplied with pressure fluid through a flexible conduit 49. The body has an apertured cover 50 retained by means of a split ring 51 and provided with a screw 52 forming an adjustable stop for the spring 33. The latter bears at its opposite end against the piston 32 which is fixed to a piston rod 53. The rod 53 extends through the rear or far end 54 of the cylinder C through a liquid-tight seal and is articulated at its outer or opposite end to the jaw 34b.

The friction lining 36b of the jaw 34b is fixed directly thereto, whereas the lining 36a of the jaw 34a is mounted on an intermediate part 34c capable of performing a movement at right angles to said jaw 34a and of small amplitude. In fact, the intermediate part 34c normally rests on a piston 55 which is itself maintained against a split ring 56. A screw 52a similar to the screw 52 passes through a cover 58 of the jaw 34a which is similar to the cover 50 and constitutes an adjustable stop for an end of a spring 57 the other end of which bears against the piston 55, for which the split ring 56 forms a stop. It is therefore clear that the spring 57, its adjustable stop 52a carried by the jaw 34a and the second stop 56 which limits the maximum displacement of the associated lining 36a under the action of the spring 57 constitute together a means for limiting the frictional clamping force of the two jaws 34a and 34b.

The jack V shown in FIGURE 2 is characterised by its liquid tightness obtained by use of a deformable diaphragm 44 and, moreover, by its single-acting operation.

The diaphragm 44 is clamped, at its central portion, between two parts of the piston 38 and, at its periphery, between two parts of the body 45 of the jack. This body is supplied with pressure fluid through a conduit 31 and closed at its opposite end by an apertured plate 46 serving as an abutment for a return spring 41 for the piston and supporting a sleeve 47 guiding the spring. The rod 39 connecting the piston 38 to the part of the coupling casing carrying the connecting point 48 is fixed to the latter by keying on a screwed head 39a and by screwing to the piston.

The operation of such a device is as follows: energisation of the electro-valve 18 supplies the conduit 17 with compressed air under a regulated pressure, for example 1 kilogram per square centimetre. The dynamic pressure exerted on the detecting diaphragm 8 causes the obturator 14 to intercept partly the jet issuing from the nozzle 15 and thus to modulate the pressure in the chamber 20. This pressure is exerted on the servo-motor diaphragm 21 which regulates the spillage between the obturator 23 and the nozzle 24. The pressure in the conduit 26 is thus modulated and this displaces the diaphragm 27 and the piston 28 of the amplifier A, transforming this air pressure into a hydraulic pressure in accordance with the ratio of the effective areas of the piston 28 and of the bellows 29. This hydraulic pressure in the conduit 31 produces the clamping of the cables 37 between the blocks or linings 36 and the movement of the couplings, since to each hydraulic pressure there corresponds a given compression of the spring 41.

When the force exerted by the oil pressure at 49 is greater than that of the spring 33, the piston 32 is shifted and abuts the cover 50. The device assumes its "clamping" position: the jaw 34b urges the intermediate part 34c and the piston 55. As the latter no longer abuts the shoulder 56, which was retaining it in the "release" position, it is the spring 57 which exerts the necessary clamping force. The latter is practically constant owing to the small travel of the spring.

In brief, the spring 33 determines the minimum oil pressure controlling the clamping action and the spring 57 ensures the clamping pressure of the jaws, which pressure is thus rendered independent of the controlling oil pressure. The screws 52 and 52a enable the force of the springs to be suitably adjusted having regard to the required precision and the possibility of manual intervention. The moment exerted by the spring 33 with respect to the pivot axis of the jaws must, of course, be greater than that exerted by the spring 57.

Any variation in the dynamic pressure results in a rapid variation of the positions of the obturators 14 and 23 and hence of the pistons 28 and 38. The throttle lever is thus shifted under the hand of the pilot at the same time as the thrust of the engines varies, in such manner as to ensure the constancy of the dynamic pressure and, consequently, of the flying speed.

In case of urgency, the pilot can move the engine levers without even disconnecting the monitoring device. For this purpose, it is sufficient for him to exert on said levers a force greater than the frictional force due to the pressure of the spring 57. By means of a switch (not shown), he may also produce de-energisation of the electro-valve 18 and, consequently, the clamping of the cables 37; in effect, the air pressure on the piston 38 drops and the spring 33 resumes its normal length, which results in the release of the jaw 34 of the coupling E.

FIGURE 5 shows a modified arrangement of the coupling in which the regulator R produces in the conduit 26 a pressure which is exerted in a manometric capsule 60 connected to the slidable piston 61 of a hydraulic distributor which is returned by a spring 62. A source of hydraulic liquid under regulated pressure, for example at 10 kilograms per square centimetre, is connected by a conduit 68 through an electro-valve 63 to a central zone 64 of the body of the distributor and to the clamping cylinder C. Two conduits 65 and 66 closed in the illustrated inoperative state by the distributor 61 supply the two opposite faces of the piston 38 of the double-acting jack V. Return conduits 67 connect the end zones of the distributor 61 and that part of the cylinder C which is located behind the piston 32 to the fluid supply tank. Finally, a mechanical return connection 69 links the coupling E to the lever 11 carrying the primary obturator; this mechanical connection may comprise a spring 70.

The operation of this device is substantially the same as that already described in connection with FIGURE 1. When the flying speed varies, the air pressure in the conduit 26, which is supplied at G, also varies and this causes movement of the distributor 61 until the consecutive movement of the coupling E, under the action of the jack V, produces the desired correction. The reaction chain represented by the mechanical connection 69 ensures the precision of the monitoring or regulating action by causing a well-defined position of the piston 38 to correspond unequivocally to a given speed of approach.

It is obvious that such a coupling may also be under the control of other control devices, for example a cascade of two regulators R arranged in series, the first, as in FIGURE 1, modulating a gas pressure, while this pressure is applied to the second regulator and modulates the pressure of a liquid actuating the jack V.

FIGURE 4 shows graphically, in very diagrammatic form and as function of the speed of approach V plotted as abscissa, a curve MN representing the output signal S of the assembly comprising the regulator R and the amplifier A of FIGURE 1 (this amplifier being replaced if required by a distributor, as in FIGURE 5, or even by a second regulator disposed in series with the first, as has been suggested above). This curve MN may also represent the thrust F of the engines, which is substantially proportional to the signal S, and is characterised by a negative slope of considerable value.

To a given speed V there corresponds, for a given configuration of the aircraft, a thrust F associated with a point P on the characteristic curve MN. If the speed decreases and assumes, for example, the value V', the device adapts the thrust in such manner as to produce a new equilibrium represented by the point P'. The high slope of the characteristic corresponds to a variation VV' of the speed which remains negligible in practice.

It is obvious that the great sensitivity necessary renders the device dependent on the load of the machine, it being possible for said load to result in a normal increase in the speed of approach which goes beyond the limits of the segment MN. Consequently, the pilot can modify the calibration of the spring 9 of the regulator R by operating the screw 10, this having the effect of shifting the characteristic curve parallel to itself. This regulation, of course, is effected as a function of the aerodynamic conditions (flaps and landing gear down or not, etc.) or of the weight of the machine (70, 80, 90 tons). A secondary adjustment has also been shown in the drawing at 25.

The device described in this way may, of course, be used not only for approach but also for preserving a selected cruising speed for the aircraft.

The invention also covers those constructional forms which employ equivalent technical means.

What is claimed is:

1. In an engine-driven piloted vehicle provided with a monitoring device for the power of at least one engine, a friction coupling embracing with a calibrated frictional clamping force the linkage connecting the engine to a throttle lever in the usual manner, thus enabling the pilot to feel the correction effected by the monitoring device and to intervene manually at any instant without even having to render the device inoperative on condition that the clamping force of said coupling has a value lower than the muscular force which the pilot is able to transmit to the linkage, said friction coupling comprising two pivoting jaws each of which is equipped with a lining having a high coefficient of friction and which clamp the linkage between them.

2. A friction coupling according to claim 1, wherein the clamping action of the jaws is effected by means of a cylinder fixed relatively to one of the jaws and which is in use supplied with a fluid under pressure, in which cylinder slides a piston connected by a connecting rod to the other jaw and returned to the release position by a spring.

3. An aircraft comprising in combination at least one engine provided with a linkage for manual control of the throttle by a pilot, a monitoring device which is sensitive to the flying speed of the aircraft and acts to produce a correcting signal in the form of pressure, and a coupling which embraces said linkage with a calibrated force and which is moved by means actuated by said pressure, the pressure signal produced by the monitoring device being amplified by a differential piston comprising two operative faces which are fixed relatively to each other and have different effective areas the smaller of which acts on a liquid admitted to a jack for moving the coupling which is single-acting and returned by a spring.

4. An aircraft comprising in combination at least one engine provided with a linkage for manual control of the throttle by a pilot, a monitoring device which is sensitive to the flying speed of the aircraft and acts to produce a correcting signal in the form of pressure, and a coupling which embraces said linkage with a calibrated force and which is moved by means actuated by said pressure, said means comprising a manometric capsule connected to said monitoring device and undergoing deformations in response to the pressure produced in said monitoring device, a distributor supplied by a source of hydraulic fluid at a regulated pressure and containing a slidable piston connected to said manometric capsule so as to be shifted by the deformation of said capsule, a jack containing a slidable piston, conduits filled with said liquid and connecting two different zones of said distributor with said jack for supplying with said hydraulic fluid the two opposite faces of said jack piston, respectively, and a connection between said jack piston and said coupling.

5. A friction clutch for clamping a cable comprising two jaws equipped with friction linings and capable to pivot about an axis so as to clamp said cable between said linings, one of said jaws bearing a cylindrical cap and the other being connected to a piston which can slide in said cap and be moved by a fluid under pressure so as to bring said jaws to their clamping position, a first spring urging said two jaws to their release position, the friction lining of one of said jaws being slidably supported by said jaw so as to be movable in the clamping direction with respect to said jaw, a second spring mounted between said slidable lining and the corresponding jaw for urging them away from each other, and a stop carried by said corresponding jaw for limiting the displacement of said slidable lining in the clamping sense.

6. A friction clutch according to claim 5, in which said first spring bears against one jaw through the intermediary of a screw-adjustable stop.

7. A friction clutch according to claim 5, in which said second spring bears against said corresponding jaw through the intermediary of a screw-adjustable stop.

References Cited by the Examiner
UNITED STATES PATENTS

| | | | |
|---|---|---|---|
| 2,626,767 | 1/53 | Bromley | 244—76 |
| 2,664,254 | 12/53 | Hendrickson | 244—76 |
| 2,847,872 | 8/58 | Todd | 74—478 |

MILTON BUCHLER, *Primary Examiner.*

ANDREW H. FARRELL, *Examiner.*